United States Patent [19]
Kawasaki

[11] Patent Number: 5,997,089
[45] Date of Patent: Dec. 7, 1999

[54] RECLINING SEAT

[75] Inventor: Seiji Kawasaki, Hiroshima, Japan

[73] Assignee: Delta Tooling Co., Ltd., Hiroshima, Japan

[21] Appl. No.: 09/126,843

[22] Filed: Jul. 31, 1998

[51] Int. Cl.[6] ...................................................... B60N 2/22
[52] U.S. Cl. .................. 297/362.14; 297/362.12
[58] Field of Search .............................. 297/362, 362.14, 297/362.12, 367, 375, 354.13

[56] References Cited

U.S. PATENT DOCUMENTS

| | | | |
|---|---|---|---|
| 1,246,659 | 11/1917 | Ritter | 297/375 X |
| 2,278,890 | 4/1942 | May | 297/375 |
| 3,046,055 | 7/1962 | Martens | 277/362.14 |
| 3,133,764 | 5/1964 | Naef | 297/367 |
| 3,156,004 | 11/1964 | Strien et al. | 297/367 X |
| 4,685,735 | 8/1987 | McFalls et al. | 297/362.14 X |
| 5,320,413 | 6/1994 | Griswold et al. | 297/362.14 X |

FOREIGN PATENT DOCUMENTS 0 594 526 A1  2/1994  European Pat. Off. .

OTHER PUBLICATIONS

Patent Abstracts Of Japan, vol. 96, No. 6, Jun. 28, 1996 & JP 08 038289 A (Delta Kogyo Co LTD), Feb. 13, 1996.

*Primary Examiner*—Peter R. Brown
*Attorney, Agent, or Firm*—Wenderoth, Lind & Ponack, L.L.P.

[57] ABSTRACT

A reclining seat includes a seat cushion, a seat back pivotally mounted on the seat cushion, and a reclining mechanism for inclining the seat back relative to the seat cushion. A center of rotation of the reclining mechanism is spaced apart from that of the seat back. The center of rotation of the seat back is positioned closer than that of the reclining mechanism to a seat occupant.

7 Claims, 8 Drawing Sheets

RECLINING SEAT

BACKGROUND OF THE INVENTION

1. Field of the Invention

The present invention relates to a reclining seat suited for use in an automotive vehicle and capable of appropriately adjusting the angle of inclination of a seat back relative to a seat cushion.

2. Description of Related Art

A conventional automobile reclining seat includes a sector gear fixed to a seat back and a worm gear rotatably mounted in a seat cushion so as to be engageable with the sector gear. The worm gear is connected to an operating shaft, and engagement of the worm gear with the sector gear is released by pulling the operating shaft in a direction axially thereof and subsequently lifting it. Under this condition, the angle of inclination of the seat back can be easily and rapidly changed by applying a load to the seat back. When the operator releases the operating shaft, the worm gear engages with the sector gear again to retain the angle of inclination of the seat back. In the case where fine adjustment of the angle of inclination of the seat back is required, rotation of the operating shaft causes rotation of the worm gear, which in turn causes a gradual rotation of the sector gear in engagement with the worm gear, making it possible to steplessly change the angle of inclination of the seat back to a desired one (see, for example, Japanese Utility-Model Publication (examined) No. 42-7950).

Another conventional automobile reclining seat includes a worm wheel fixed to a seat cushion and a worm gear rotatably mounted in a seat back with the worm wheel being in engagement with the worm gear. The worm gear has a groove defined therein to loosely receive a peripheral edge of the worm wheel. When the peripheral edge of the worm wheel is inserted into the groove of the worm gear by rotating a handle connected to the worm gear, engagement of the worm gear with the worm wheel is released, making it possible to change the angle of inclination of the seat back to a desired one. After the angle of inclination of the seat back has been changed, release of the handle causes a spring to rotate the worm gear by 90°, resulting in a locked condition in which the worm gear is again held in engagement with the worm wheel. If the handle together with the worm gear is rotated gradually, the worm wheel in engagement with the worm gear is also rotated gradually, enabling fine adjustment of the angle of inclination of the seat back (see, for example, Japanese Patent Publication (examined) No. 52-9892).

Furthermore, a reclining seat having a sector gear fixed to a seat back frame and a lock gear in engagement with the sector gear is known wherein the angle of inclination of the seat back can be appropriately changed by manually releasing engagement of the sector gear with the lock gear.

In each of the above-described conventional reclining seats, however, after mating parts such as the sector gear, the worm gear or the like have been incorporated into the seat back, the seat back must be covered with a cushioning material of at least about 35 millimeters thick to remove a sense of foreign substances, making it difficult to provide easy-to-make reclining seats.

Also, it is the general practice that when a relatively large impact is applied to the reclining seat due to, for example, a vehicle collision, impact energy is generally absorbed by deformation of the sector gear or the like. However, some of the conventional reclining seats cannot fully absorb such large impact energy.

Moreover, because a greater trochanter of a seat occupant is spaced a distance away from the center of rotation of the seat back, the hip of the seat occupant slides on the seat in inclining the seat back, thus giving the seat occupant an unpleasant feeling.

SUMMARY OF THE INVENTION

The present invention has been developed to overcome the above-described disadvantages.

It is accordingly an objective of the present invention to provide a reclining seat capable of steplessly adjusting the angle of inclination of the seat back and effectively absorbing impact energy.

Another objective of the present invention is to provide the reclining seat of the above-described type which is comfortable and can be readily manufactured at a low cost.

In accomplishing the above and other objectives, the reclining seat according to the present invention includes a seat cushion, a seat back pivotally mounted on the seat cushion and having a center of rotation, and a reclining mechanism for inclining the seat back relative to the seat cushion. The reclining mechanism has a center of rotation spaced apart from the center of rotation of the seat back. The center of rotation of the seat back is positioned closer than the center of rotation of the reclining mechanism to a seat occupant.

Advantageously, the seat cushion has a seat cushion frame accommodated therein and the reclining mechanism includes first and second links having respective first ends rotatably mounted on the seat cushion frame and also having respective second ends connected to each other. The first end of the first link is employed as the center of rotation of the seat back, while the first end of the second link is employed as the center of rotation of the reclining mechanism.

The reclining seat preferably includes a sector gear connected to the first end of the second link and a worm gear rotatably mounted on the seat cushion and being in mesh with the sector gear. Each of the sector gear and the worm gear has a lead angle greater than an angle of friction thereof. When locking of the worm gear has been released, the seat back is inclined by applying a force to the seat back.

Conveniently, the reclining seat includes a lock member mounted on the seat cushion and having internal teeth formed therein. In this case, the worm gear has external teeth formed at a portion thereof and is locked when the external teeth thereof are in mesh with the internal teeth of the lock member. The worm gear is locked or unlocked by moving the lock member in a direction axially of the worm gear.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on application No. 9-64267 filed Mar. 18, 1997 in Japan, the content of which is incorporated hereinto by reference.

Figure 1:
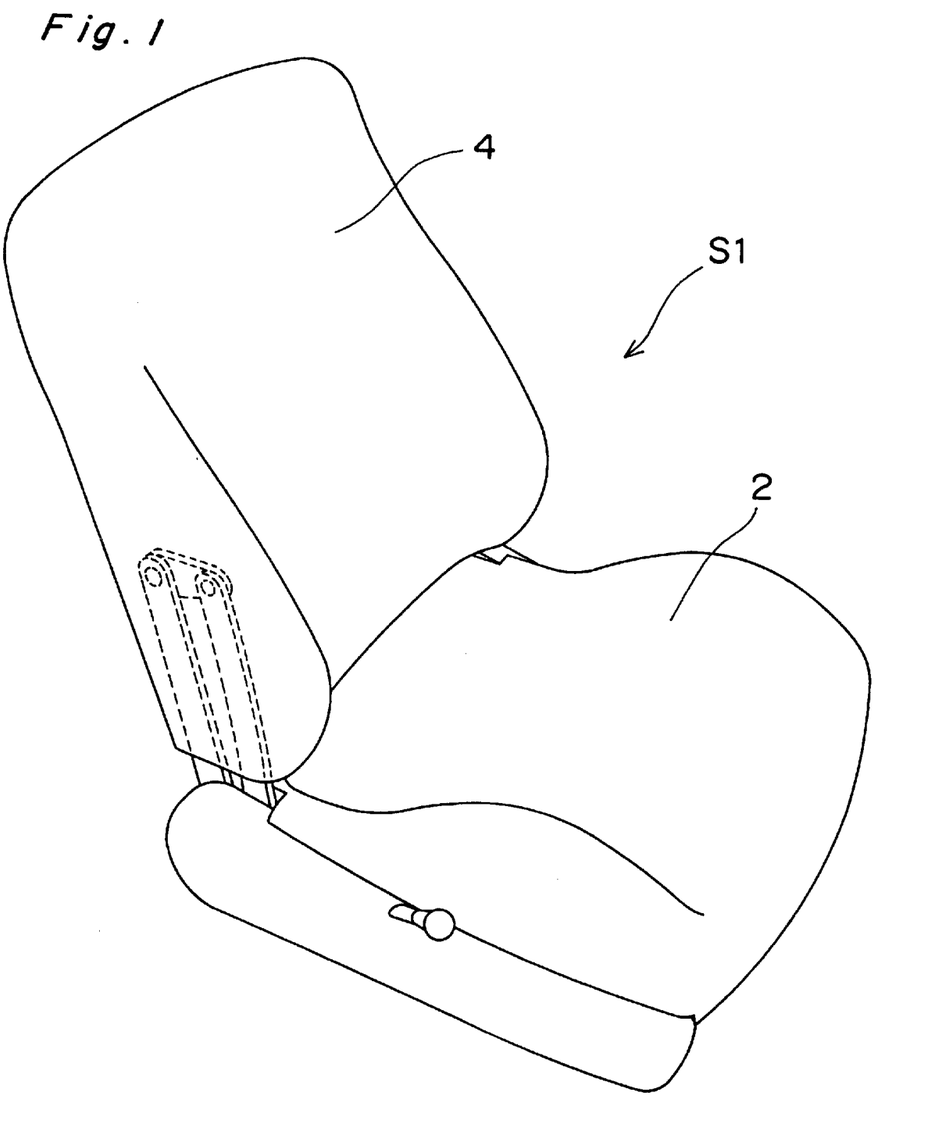
FIG. 1 is a perspective view of a reclining seat according to a first embodiment of the present invention.
Figure 2:
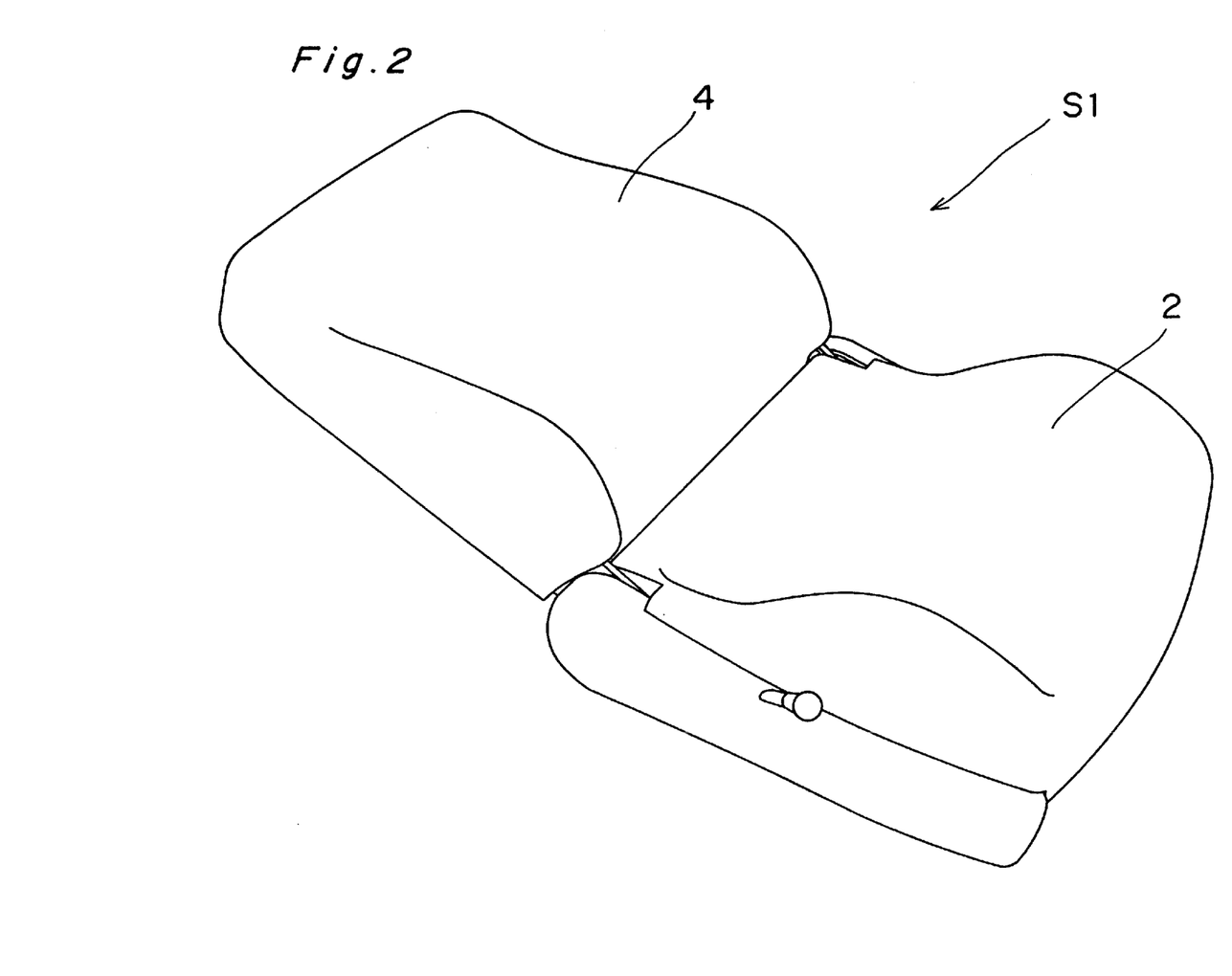
FIG. 2 is a perspective view of the reclining seat of FIG. 1, particularly depicting the condition in which a seat back has been inclined backwardly.

Referring now to the drawings, there is shown in FIGS. 1 and 2 a reclining seat S1 embodying the present invention. The reclining seat S1 shown therein includes a seat cushion 2 and a seat back 4 pivotally mounted on the seat cushion 2 via a reclining mechanism R. The seat cushion 2 and the seat back 4 accommodate a seat cushion frame (not shown) and a seat back frame (not shown), respectively.

Figure 3:
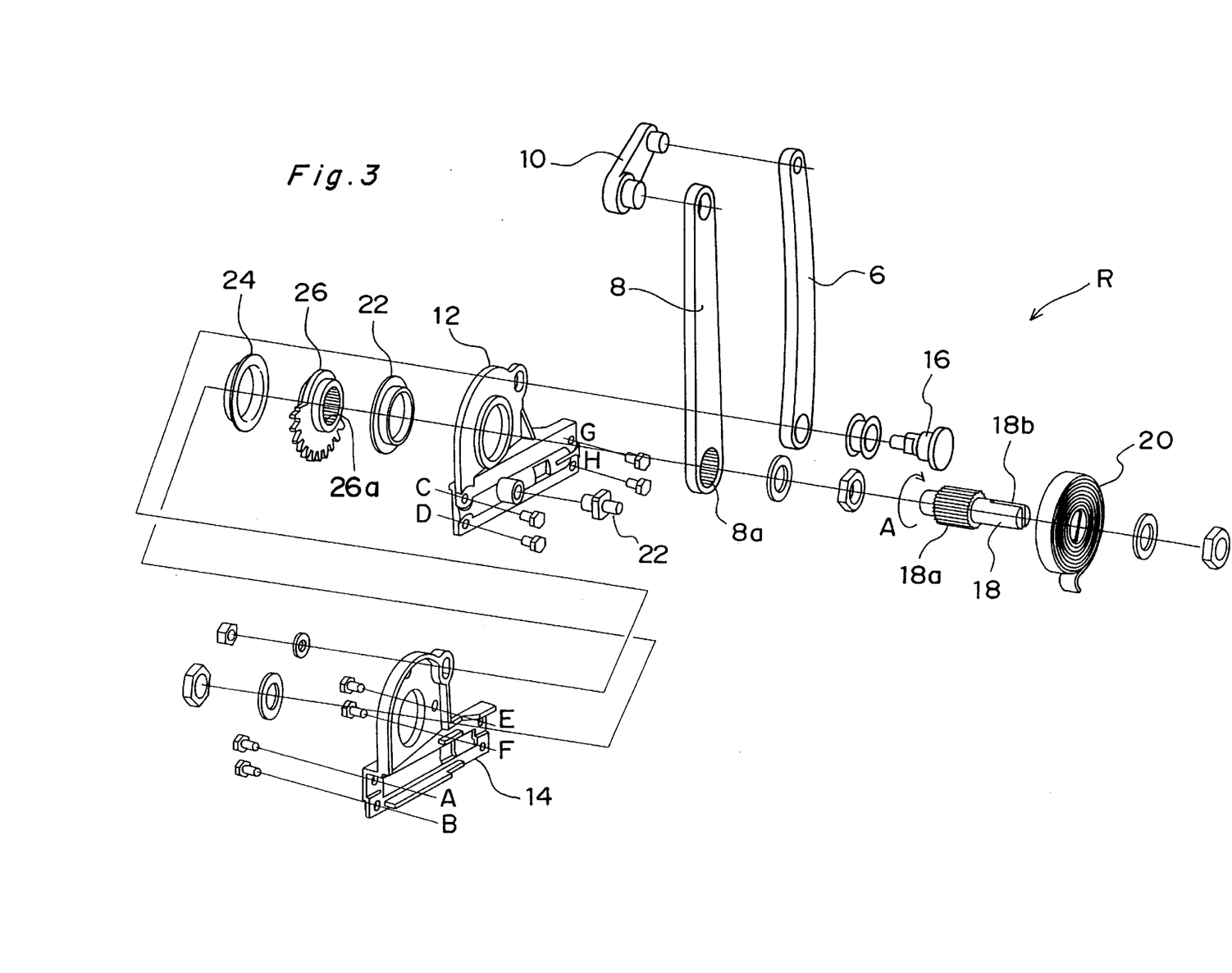
FIG. 3 is an exploded perspective view of a reclining mechanism mounted on the reclining seat of FIG. 1.

As shown in FIG. 3, the reclining mechanism R includes a plurality of links 6, 8 and 10 for pivotally connecting the seat back 4 to the seat cushion 2. Of the plurality of links 6, 8 and 10, the two links 6 and 8 extend generally parallel to each other and have respective upper ends connected to each other by of the link 10. The link 6 is secured to the seat back frame and has a lower end rotatably mounted via a pin 16 on a pair of brackets 12 and 14 secured to the seat cushion frame. The lower end of the link 6 is a center of rotation of the seat back 4. As illustrated, links 6 and 8 are longitudinally rigid and non-extrusible.

The link 8 has internal teeth 8a formed at a lower end thereof and being in mesh with external teeth 18a formed on a rod 18 that is a center of rotation of the reclining mechanism R. The rod 18 has a notch 18b defined therein at one end thereof in which one end of a coil spring 20 is engaged, while the other end of the coil spring 20 is engaged with a pin 22 fixedly mounted on the bracket 12, thereby always biasing the seat back 4 forward.

Figure 4:
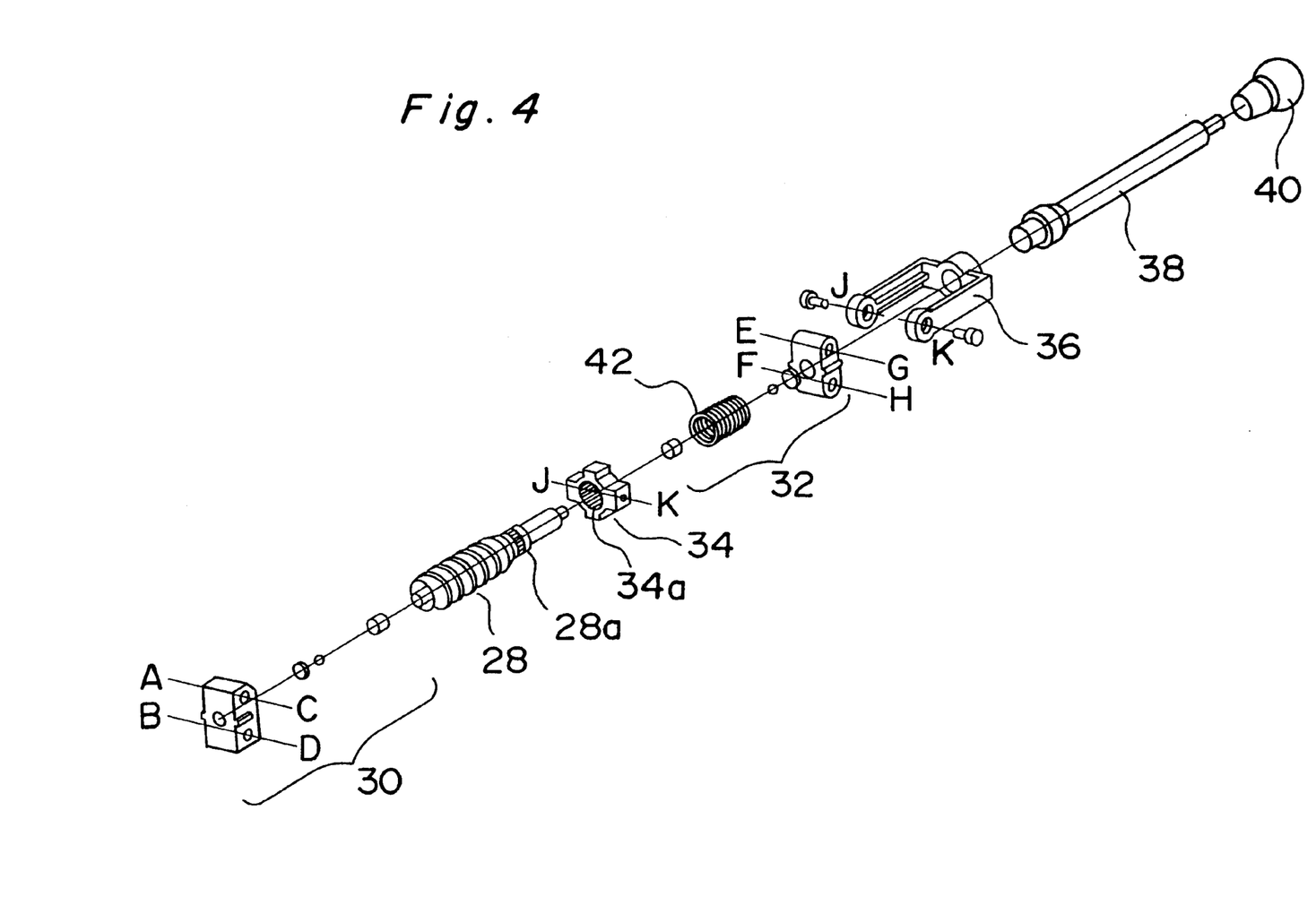
FIG. 4 is an exploded perspective view of a lock mechanism in the reclining mechanism of FIG. 3.

A sector gear 26 is interposed between the pair of brackets 12 and 14 via two retainer rings 22 and 24 disposed on respective sides of the sector gear 26. The sector gear 26 has internal teeth 26a formed therein that are in mesh with the external teeth 18a of the rod 18. As shown in FIG. 4, the pair of brackets 12 and 14 are screwed at front and rear ends thereof to a pair of bearings 30 and 32 in which a worm gear 28 in mesh with the sector gear 26 is journaled.

Figure 5:
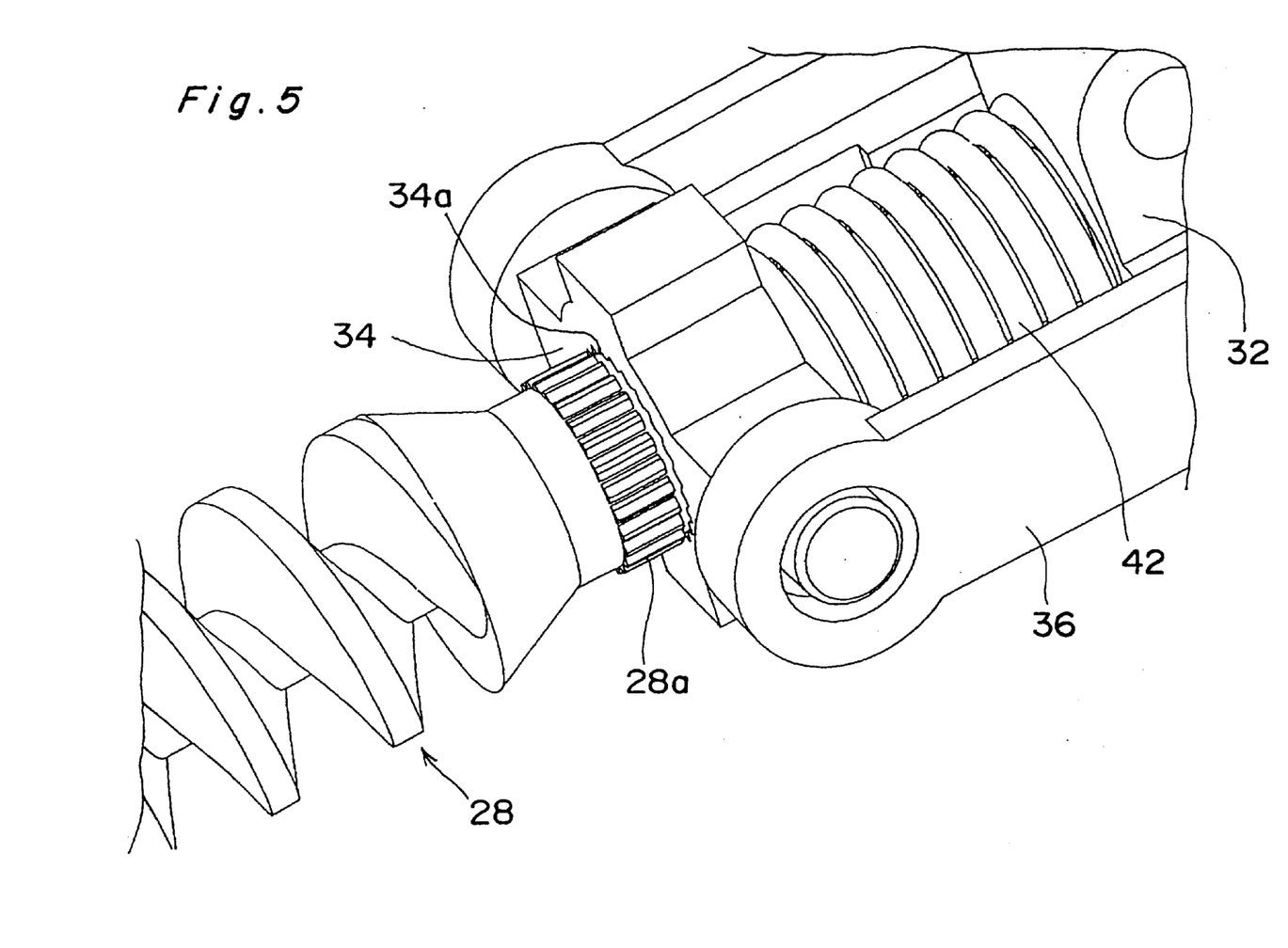
FIG. 5 is a fragmentary perspective view, on an enlarged scale, of an essential portion of the lock mechanism of FIG. 4.

As shown in FIGS. 4 and 5, the worm gear 28 has external teeth 28a formed at an intermediate portion thereof that are engageable with internal teeth 34a formed in a generally cross-shaped lock member 34 to lock the worm gear 28. The lock member 34 is slidably mounted on the seat cushion 2 and is held by a generally U-shaped holder 36 that is connected to an operating knob 40 via a rod 38. The lock member 34 is biased by a coil spring 42 in the direction in which the internal teeth 34a of the lock member 34 are held in mesh with the external teeth 28a of the worm gear 28.

Each of the sector gear 26 and the worm gear 28 in mesh with each other has a lead angle greater than the angle of friction thereof. Under the condition in which locking of the worm gear 28 by the lock member 34 has been released, the seat back 4 is easily inclined forward by the action of a biasing force of the coil spring 20, while the seat back 4 is inclined backward by applying a backward force (load) to the seat back 4. That is, inclination of the sector gear 26 results in rotation of the worm gear 28.

It is to be noted that because the reclining mechanism shown in FIGS. 3 and 4 is disposed on only one side of the seat, it is sufficient if another set of links 6, 8 and 10 as shown in FIG. 3 is mounted on the seat cushion on the other side of the seat using two pins (identical to pin 16).

The reclining seat of the above-described construction operates as follows.

Figure 6:
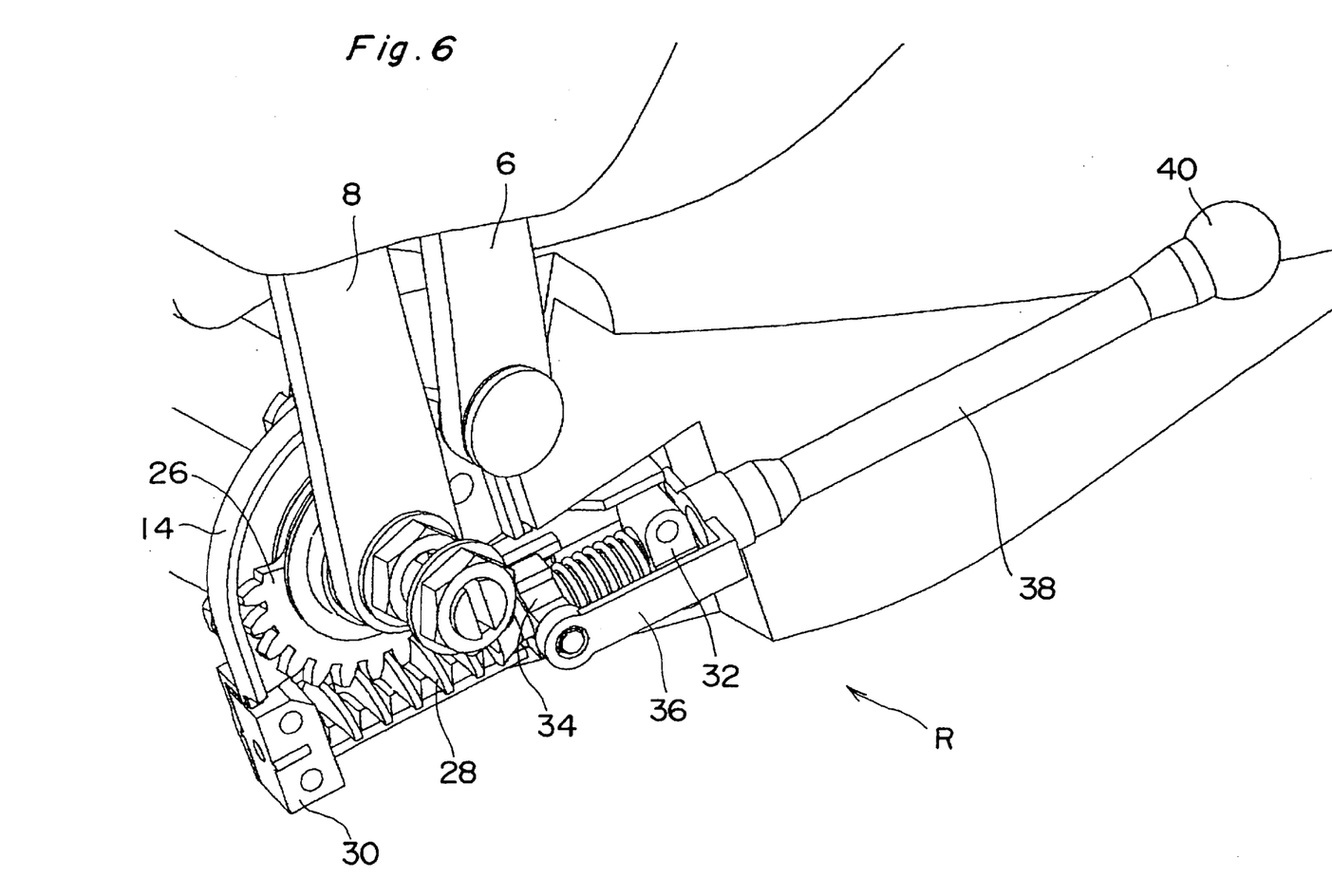
FIG. 6 is a perspective view of the reclining mechanism when locked.

As shown in FIG. 6, under the ordinary condition in which the operating knob 40 is not operated, the internal teeth 34a of the lock member 34 are held in mesh with the external teeth 28a of the worm gear 28 by the action of a biasing force of the coil spring 42 (omitted in FIG. 6), thereby preventing rotation of the worm gear 28. Under this condition, because rotation of the sector gear 26 in mesh with the worm gear 28 is also prevented, the plurality of links 6, 8 and 10 are retained at the present position. Accordingly, neither the biasing force of the coil spring 20 nor the application of a backward force to the seat back 4 can incline the seat back 4.

Figure 7:
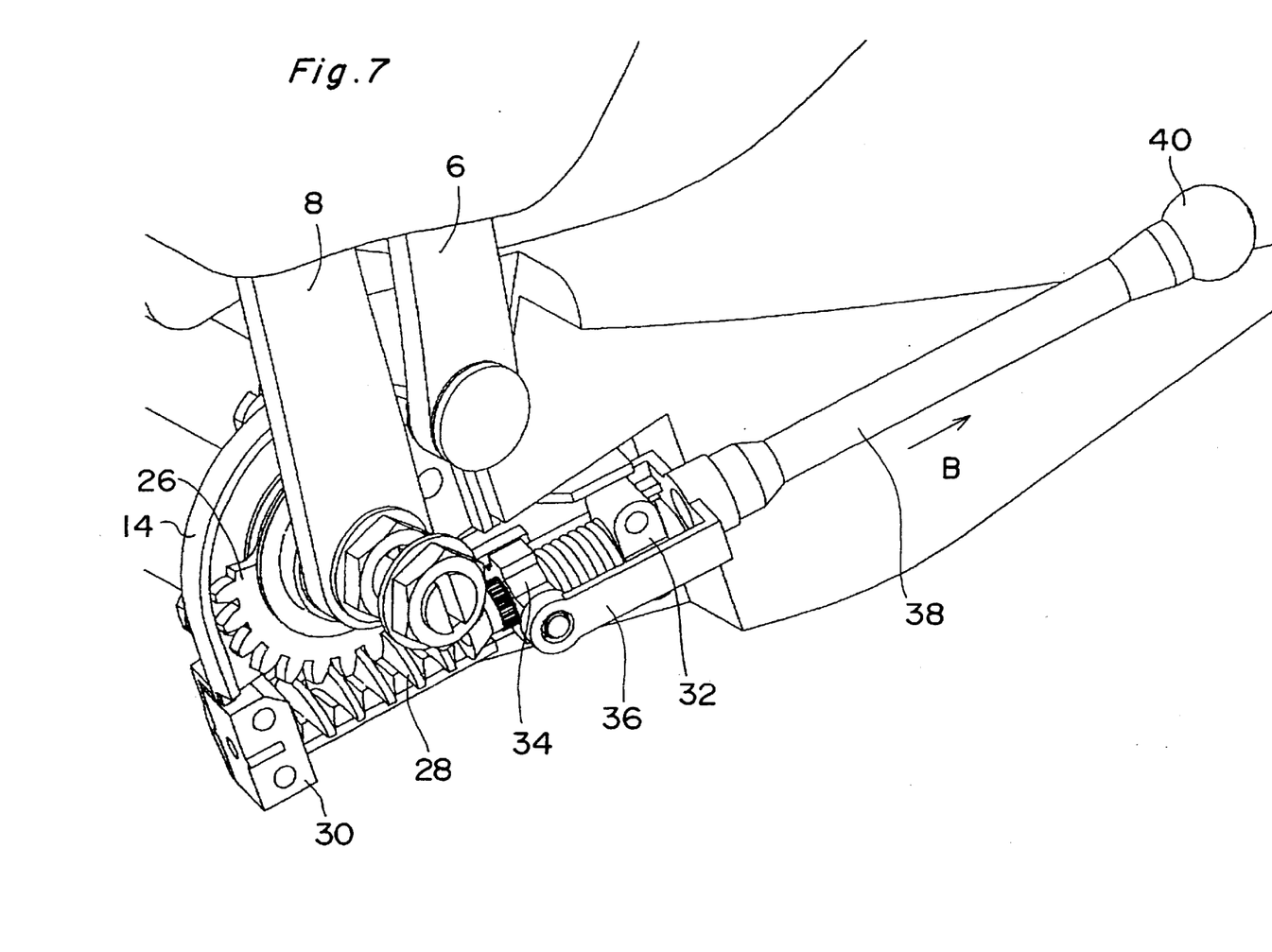
FIG. 7 is a perspective view of the reclining mechanism when unlocked.

On the other hand, when changing the angle of inclination of the seat back 4 is desired, pulling the operating knob 40 as shown by an arrow B in FIG. 7 causes the lock member 34 to move in a direction axially of the worm gear 28 (in the direction shown by the arrow B) via the rod 38 and the holder 36, thus releasing the locking of the worm gear 28 by the lock member 34. When a forward inclination of the seat back 4 is desired, it is sufficient if the seat occupant merely leans forward. This causes the biasing force of the coil spring 20 to rotate the rod 18 and the sector gear 26 in a direction shown by an arrow A in FIG. 3. Because the lead angle of the worm gear 28 in mesh with the sector gear 26 is greater than the angle of friction thereof with the sector gear 26, a rotational force applied to the sector gear 26 rotates the worm gear 28 together with the sector gear 26. As a result, the links 6 and 8 incline forwardly to incline the seat back 4 forwardly about the lower end of the link 6. When the operating knob 40 is released at a desired position, the biasing force of the coil spring 42 moves the lock member 34 in a direction opposite to the arrow B in FIG. 7 so that the internal teeth 34a of the lock member 34 may mesh with the external teeth 28a of the worm gear 28 again, thus preventing rotation of the worm gear 28 and maintaining the angle of inclination of the seat back 4.

In contrast, when a backward inclination of the seat back 4 is desired, it is sufficient if a backward force is applied to the seat back 4 under the condition in which the operating knob 40 has been pulled. This causes the worm gear 28 to rotate in a direction opposite to the case where the seat back 4 is inclined forwardly. Rotation of the worm gear 28 is followed by rotation of the sector gear 26, which in turn causes a backward inclination of the seat back 4 via the links 6, 8 and 10. When the operating knob 40 is released at a desired position, the worm gear 28 is locked again by the lock member 34 to maintain the angle of inclination of the seat back 4.

In the reclining seat S1 discussed above, because the seat back 4 accommodates only the links 6, 8 and 10 and no mating parts, the seat back 4 can be extremely easily manufactured at a low cost.

Figure 8:
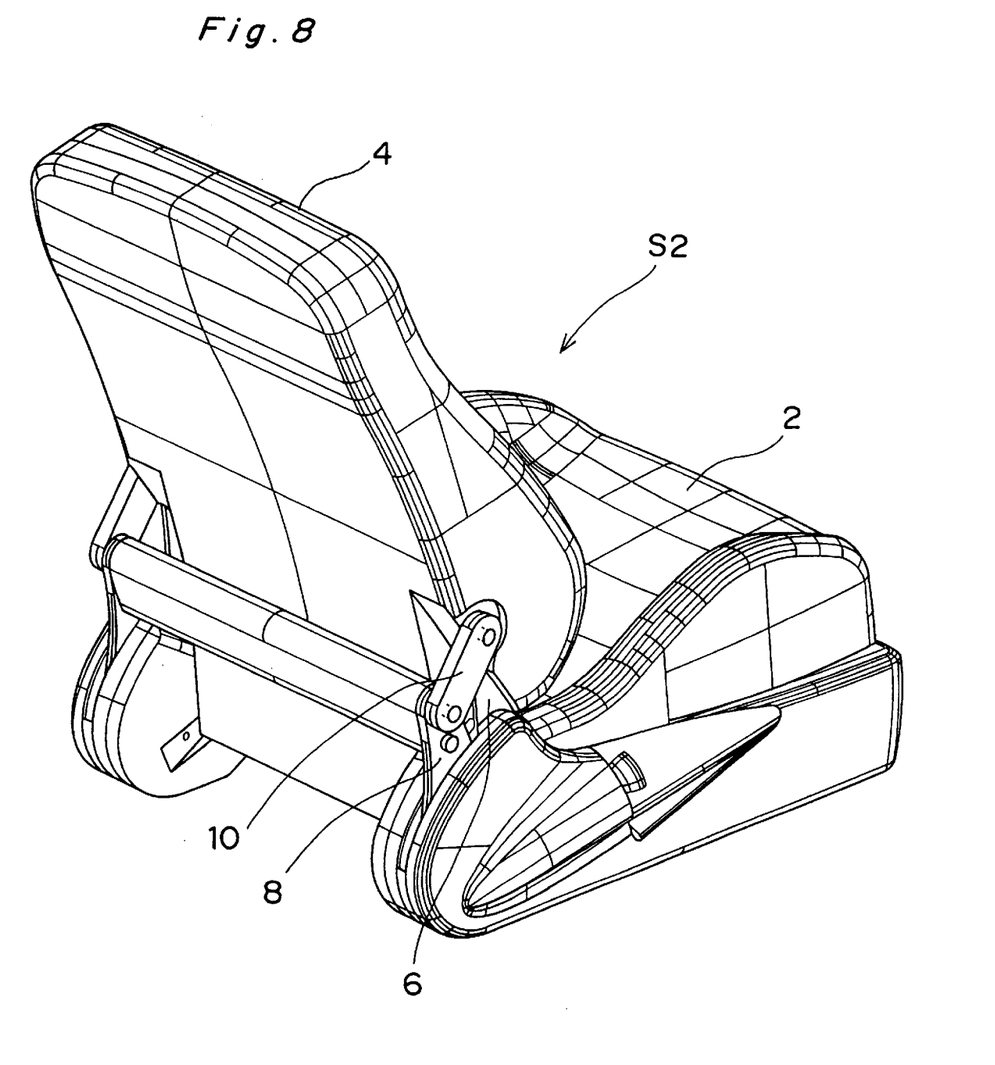
FIG. 8 is a perspective view of a reclining seat according to a second embodiment of the present invention.

FIG. 8 depicts a reclining seat S2 according to a second embodiment of the present invention in which the links 6, 8 and 10 are disposed outside the seat back 4.

This construction further facilitates the manufacture of the seat back 4, because it is sufficient if only the link 6 is secured to the seat back frame, and it is not necessary to incorporate component parts constituting the reclining mechanism into the seat back 4. Because the operation of the reclining seat S2 shown in FIG. 8 is identical to that of the reclining seat S1 shown in FIGS. 1 and 2, explanation thereof is omitted.

In each of the reclining seats S1 and S2 referred to above, the lower end of the link 8 is employed as the center of rotation of the reclining mechanism, while the lower end of the link 6 spaced apart therefrom is employed as the center of rotation of the seat back 4. The center of rotation of seat back 4 is located forwardly of the center of rotation of the reclining mechanism relative to the front of the reclining seats. Accordingly, the distance between the center of rotation of the seat back 4 and a greater trochanter of a seat occupant can be shortened compared with conventional reclining seats. Because the hip of the seat occupant does not slide on the seat when the seat back 4 is inclined, the reclining seat S1 or S2 does not give the seat occupant an unpleasant feeling.

Furthermore, if a relatively large impact force is applied to the seat due to, for example, a vehicle collision, the two links 6 and 8 extending generally parallel to each other are deformed to absorb impact energy, thereby making the seat occupant safe.

Also, because each of the sector gear and the worm gear in mesh with each other has a lead angle greater than the angle of friction thereof, not only can the seat back be readily inclined but also the angle of inclination thereof can be steplessly adjusted by releasing locking of the worm gear and applying a force to the seat back.

The locking or unlocking of the worm gear is positively accomplished by a simple construction. That is, the locking or unlocking of the worm gear can be carried out merely by moving the lock member in a direction axially of the worm gear.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A reclining seat comprising:

a seat cushion having a seat cushion frame and a seat back having a seat back frame; and a reclining mechanism for inclining said seat back relative to said seat cushion, said reclining mechanism comprising:

a first link having a first end rotatably mounted on said seat cushion frame to define a first center of rotation of inclining movement of said seat back relative to said seat cushion and a second end extending from said first end away from said seat cushion;

a second link having a first end rotatably mounted on said seat cushion frame to define a second center of rotation of said reclining mechanism and a second end extending from said first end of said second link away from said seat cushion and connected to said second end of said first link;

said first link and said second link each being longitudinally rigid and non-extensible; and said first center of rotation being located forwardly of said second center of rotation relative to a front of said reclining seat.

2. A reclining seat as claimed in claim 1, wherein said second ends of said first link and said second link are connected by a third link.

3. A reclining seat as claimed in claim 2, wherein said second ends of said first link and said second link are pivotally connected to respective opposite ends of said third link.

4. A reclining seat as claimed in claim 1, wherein said second ends of said first and second links are located inwardly of said seat back.

5. A reclining seat as claimed in claim 1, wherein said first and second links are located outwardly of said seat back.

6. A reclining seat as claimed in claim 1, further comprising a sector gear connected to said first end of said second link, and a worm gear rotatably mounted on said seat cushion and meshing with said sector gear, each of said sector gear and said worm gear having a lead angle greater than an angle of friction thereof, whereby when locking of said worm gear is released said seat back may be inclined by application of a force thereto.

7. A reclining seat as claimed in claim 6, wherein said worm gear includes a portion having external teeth, and further comprising a lock member mounted on said seat cushion and having internal teeth, said lock member being movable axially of said worm gear between a locked position, whereat said internal teeth mesh with said external teeth, and an unlocked position, whereat said internal teeth are out of mesh with said external teeth.

* * * * *